ns of the drawings, it will be noted that the several slots or openings 26 have been disposed in radially spaced relationship in respect to the center of the die aperture 18. Further and on reference to Figs. 1 and 2, it will be noted that the openings 26 have been disposed in radially spaced relationship in respect to the perimetrical or marginal edge of the die aperture 18 and inwardly of the outer marginal edge or circumference of the die block 12.

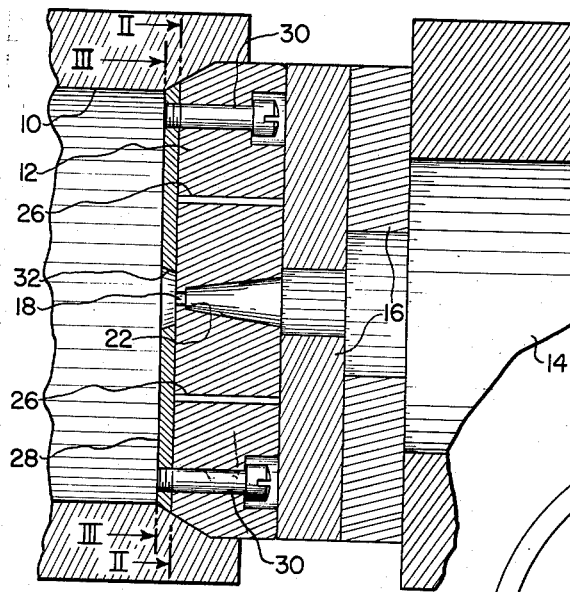
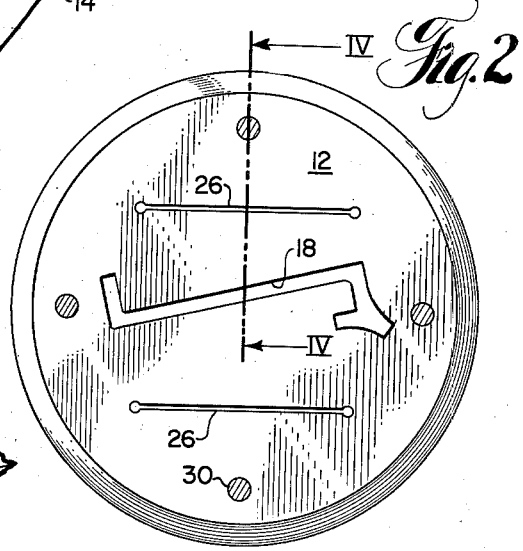
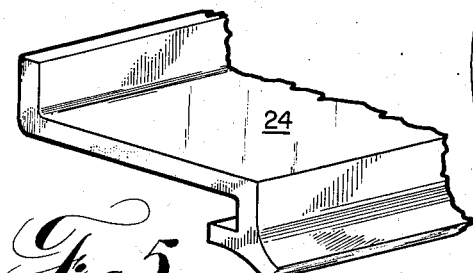
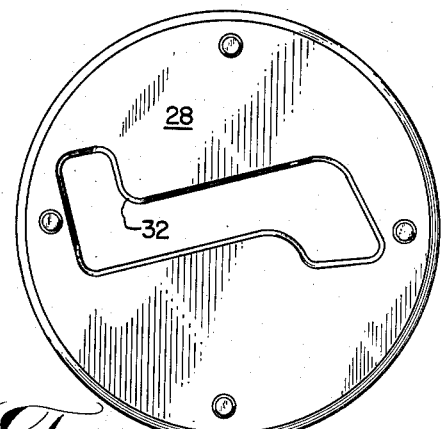
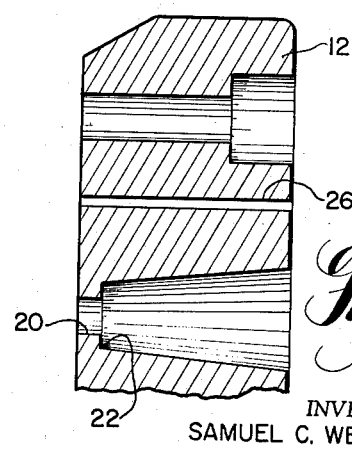

United States Patent Office 2,968,835
Patented Jan. 24, 1961

2,968,835
EXTRUSION DIE STRUCTURES

Samuel C. Weston, Jr., Pottsville, and John W. Oswald, Minersville, Pa., assignors to Aluminum Company of America, Pittsburgh, Pa., a corporation of Pennsylvania Filed Mar. 21, 1958, Ser. No. 723,059

5 Claims. (Cl. 18—12)

This invention relates in general to the art of extrusion and is more specifically concerned with improvements in extrusion die structures for the production of extruded material of commercially accurate dimensional cross-section in indeterminate lengths of the same.

It is a general observation with presently employed extrusion die structures that the cross-sectional size or transverse cross-sectional area of an extrusion is somewhat smaller than the cross-sectional area of the extrusion die orifice through which the same was produced, when both are determined at room temperature. This difference in cross-sectional area is believed to be caused, in part at least, by the difference in thermal expansion and contraction between the material of the extrusion dies and the material under extrusion therethrough. In addition, dimensional differences are also attributable to a physical change in the extrusion die aperture or orifice, as a result of the pressures developed on the die during extrusion. In this connection, it will be appreciated that the pressures developed during extrusion act to compressively deform the die, within the elastic properties of the material of the die, to decrease the size of the die orifice or aperture.

It will be apparent that knowledge of the thermal expansion and contraction of a die, and the material extruded therethrough, can be applied within a considerable degree of accuracy in die design to compensate for, and at least partially eliminate, the undersize cross-sectional dimensions of an extrusion resulting from temperature changes during extrusion. On the other hand, dimensional changes in a die orifice resulting from physical compressive deformation of the die structure under load poses a much more difficult problem varying substantially proportionally with the unit stresses developed in the die resisting the total load or extrusion pressure applied thereon.

It is an object of the invention to provide a female extrusion die incorporating relief means capable of at least partially relieving the effects of temperature and pressure on the dimensional accuracy of the aperture within said die.

It is a further object of the invention to provide a female extrusion die capable of maintaining an accurate die opening over the normal range of temperature and extrusion pressure employed and/or developed thereon.

Another object of the invention is to provide an extrusion die capable of producing extrusions in indeterminate length characterized by substantially uniform dimensional cross-sectional contour.

Other objects and advantages of the invention will be understood on consideration of the following description and illustrations, in which:

Fig. 1 illustrates a fragmentary sectional view through an extrusion apparatus employing the female extrusion die of the invention;

Fig. 2 illustrates a front elevational view taken on the plane II—II of Fig. 1;

Fig. 3 shows a front elevational view taken on the plane III—III of Fig. 1;

Fig. 4 is a fragmentary sectional elevation taken on the plane IV—IV of Fig. 2; and Fig. 5 is a fragmentary perspective view of an extrusion capable of accurate dimensional production using the extrusion mechanism of Figs. 1 through 4.

In its broadest aspect the invention relates to a female extrusion die block provided with an aperture or orifice defining and controlling the transverse cross-sectional shape and area of the extrusion to be die-expressed therethrough. Means for controlling and maintaining the dimensional accuracy of the die aperture is provided in the form of one or more relief openings or slots extending axially through the thickness of the extrusion die, the aforesaid openings or slots being disposed radially outwardly away from, or isolated from, the perimetrical or marginal edge of the aperture in the extrusion die and inwardly of the outer marginal edge or circumference of the die block.

In more specific terms, and on reference to the illustrations appended hereto, it will be observed that Fig. 1 depicts a sectional view through an extrusion apparatus in which only those elements essential to an understanding of the invention have been illustrated. Therein 10 identifies an extrusion cylinder or container for confining material to be extruded. The cylinder 10 is shown in position relative to a female extrusion die 12, which is preferably held in compressive relationship in respect thereto by means of a fixed or rigid portion of the extrusion apparatus, such as the press platen 14, and one or more intermediate filler or back-up members 16. The die 12 and filler members 16 are normally supported in a tool container (not shown) for ready manipulation of the extrusion tools. It will be understood that the elements 10, 12 and 16 are arranged in columnar pressure resisting relationship in respect to the fixed platen 14 of the extrusion apparatus thus far described.

A die aperture 18 is machined or otherwise formed in the female extrusion die 12, and as is customary, the aperture 18 is preferably provided with a relatively axially short land 20 and is thereafter relieved at 22 to reduce frictional resistance on the material extruded therethrough to a minimum. The die aperture 18 has been illustrated in the several illustrations of the invention as having a cross-sectional area suitable for the production of indeterminate lengths of an extruded member 24 of Fig. 5.

Under the pressures developed in extrusion practice employing apparatus of the type above described, the die 12 is compressively deformed to thereby reduce its axial thickness and crowd the material of the die radially inwardly towards the center thereof, with the net result that the die aperture 18 is decreased in area. Where the container 10, or a liner or sleeve within the container, when such is employed, engages the marginal peripheral edge of the die 12 and thereby restrains radial outward expansion of the die under compressive deformation of the same, the reduction in the area of the die aperture 18 is even more pronounced. Under either condition, the center of the die block 12, and particularly the geometric center of the die aperture 18, can be considered a "soft" spot into which the material of the die 12 is crowded under compressive deformation resulting from the load applied on the front or entrance face of the die 12.

Substantial elimination of and/or compensation for the aforesaid die aperture transformation has been obtained by providing one, and preferably two or more, openings or slots 26 extending axially through the thickness of the female extrusion die 12. The number of slots or openings 26, which are spaced outwardly away from, or isolated from, the walls defining the die aperture 18, will depend on the shape and area of the die aperture 18, as well as its location in respect to the true center of the die 12. In symmetrical, or substantially symmetrical relatively wide thin extrusions, such as that represented at 24 in Fig. 5, it is usual to provide at least a pair of relief openings 26 as a means of balancing or offsetting the effect of compressive deformation of the die 12 and resulting tendency of the die aperture 18 to close in on itself, or become narrower in width, than the section thickness desired in the extrusion 24 produced therethrough.

The expansion or relief slots 26 can be expeditiously provided in the form of saw-cuts through the thickness of the die block 12 and preferably extend between initially drilled holes defining the ends of the slots, as well as their length.

In the case of relatively heavy or bulky extrusions of substantially square, rectangular or circular transverse cross-section, or extrusions of exterior configurations defined by geometrical curvilinear and straight lines, as distinguished from the relatively thin, wide transverse cross-section of extrusion 24, it has been found desirable in practice to employ a plurality of relief openings 26 disposed in spaced and isolated relationship around and adjacent the perimetrical walls defining the die apertures through which particular extrusions of this general type are to be extruded. For example, an extrusion die provided with a die aperture of substantially square or rectangular transverse cross-sectional configuration or area would preferably incorporate an expansion or relief slot 26 adjacent and isolated from each of the four sides or walls defining the die aperture. On the other hand, an extrusion die provided with a circular die aperture would preferably incorporate at least two separate slots 26 isolated from each other, and spaced outwardly away from the wall defining the circular die aperture, the slots also being of generally curvilinear form substantially concentric with the die aperture. Combinations of straight and curvilinear slots would normally be employed where the wall defining a die aperture incorporated curved and straight lines in its configuration.

One or more plates 28 are provided to cover the entrance to the slots 26 against ingress of material confined within the cylinder or container 10 and under forcible propulsion through the die aperture 18. One such plate 28 has been disclosed in the construction of die 12 and it is preferably secured on the entrance face thereof (Figs. 1 and 3) by means of cap screws 30, or similar securing devices.

In further explanation of the operation and performance of the extrusion die structure described above, material to be extruded is charged into the container 10 and is advanced through the die aperture 18 under pressure exerted by a ram (not shown) entering the front or left hand end of the container, as viewed in Fig. 1. The cover plate is provided with an opening 32 therethrough in registry with the die aperture 18, but otherwise restricts and prevents entrance of the material under extrusion into or through the slots or openings 26, the extrusion flow being entirely through the die opening or aperture 18.

The slots or openings 26 compensate for the previously described deformation of the block 12, and attendant decrease in the area of the die aperture 18 under the applied extrusion pressures. In explanation of the function and operation of the slots 26, it is believed that at least some of the material of the die block 12 is displaced into the slots 26, as a result of the aforesaid compressive deformation of the die under the load imposed thereon, as distinguished from entire displacement thereof into the die aperture 18, to thereby compensate for the normally expected reduction in the area of the die aperture.

Extrusion dies identical in all respects, except for the presence of the expansion or relief slots 26, have been compared in commercial production of aluminum and aluminum alloy extrusions, using a well-known 2500 ton extrusion press, with the observed result that the presence of the aforesaid slots successfully reduced the closing effect on the die apertures to between 25 to 45 percent less than that observed in identical dies devoid of the slots, with a proportional improvement in the geometrical contour or configuration of the extrusions. Expressing the improvement attained by employing the expansion or relief slots of the invention, a particular extrusion die having an opening or aperture measuring 0.147 inch between the die bearing walls defining a relatively thin web-like extruded product resulted in producing a web thickness in the extruded member expressed through the die aperture measuring 0.124 inch, or a reduction of 0.023 inch less than the original die opening. Employing the same extrusion die with an expansion or relief slot adjacent and isolated from the bearing walls defining the aforesaid web portion of the extruded product resulted in the production of an extruded member in which the web section thickness was only reduced 0.016 inch. In this particular numerical example, then, the closing effect on the die aperture bearing walls was reduced from 0.023 inch to 0.016 inch, a reduction of 0.007 inch, or 30 percent.

Although a specific die structure has been selected for purposes of illustrating the invention, it is to be understood that the invention will function with equal success in the production of variously shaped solid and tubular extrusions, in which latter case a suitable mandrel or core member would be carried by the pressure-exerting ram of the extrusion press and define with the female die aperture the particular tubular extrusion desired.

Having thus described and explained the invention and its mode of operation, it is to be understood that it is not to be limited in any way other than as defined in the appended claims.

What is claimed is:

1. A female extrusion die comprising a die block having a front face exposable to extrusion pressure, a die aperture therethrough normal to the front face of the die block, said die block being subject to compressive deformation under applied extrusion force to cause reduction of the cross-sectional area of the die aperture, by unrestricted expansion openings through the die block from the front face thereof in the axial direction of the aperture therethrough, said openings being in spaced isolated disposition in respect to themselves and the aperture, the said openings having a total cross-sectional area substantially proportional to the reduction in cross-sectional area of the die aperture under compressive deformation of the die block, and a cover plate attached to the front face of the die block closing the entrances to the expansion openings through the die block.

2. In combination with an extrusion container for receiving material to be extruded, a female extrusion die block radially restrained against outward expansion under extrusion load by marginal engagement with an interior surface of the container, a die aperture extending axially through the die block subject to cross-sectional area reduction under extrusion load, an unrestricted relief opening axially through the die block in isolated location in respect to said die aperture, said unrestricted opening having a cross-sectional area substantially proportional to cross-sectional area reduction of the die aperture under extrusion load, and a cover plate over the relief opening in a plane of entrance to the die aperture.

3. In combination with an extrusion container for receiving material to be extruded, a female extrusion die block having an orifice therethrough normal to the entrance face thereof, said die block closing a normally open end of the container and being subject to compressive deformation under extrusion force applied on the material in the container to be extruded and expelled through the orifice and providing a total cross-sectional area substantially equal to the reduction in cross-sectional area of the die orifice under compressive deformation of the die block, said die block being restrained against outward expansion under the applied extrusion force by marginal engagement with an interior surface of the container, expansion openings through the die block in the axial direction of the orifice therethrough, said openings being in spaced isolated disposition in respect to each other and the orifice, and a cover over each expansion opening closing the entrance thereto.

4. An extrusion die structure comprising a die block having a front face and a die aperture extending axially therethrough from the front face, said die block being compressibly deformable and the cross-sectional area of the die aperture reduced in resisting an applied extrusion loading against the front face of the die block, an opening extending axially through the die block from the front face thereof, said opening being located adjacent the die aperture, isolated therefrom and within the front face area of the die block resisting applied extrusion loading, said opening being selected in its cross-sectional area substantially proportional to the reduction in cross-sectional area of the die aperture under extrusion loading of the die block, and a cover overlying the entrance to the opening in the front face of the die block preventing ingress of material under extrusion into the opening.

5. An extrusion die structure comprising a die block having a substantially flat front face in pressure resisting relationship to an applied extrusion force, a die aperture extending axially through the die block from its flat front face, said die block under applied extrusion force being compressibly deformable to reduce the cross-sectional area of the die aperture, at least one opening extending axially through the die block from the flat front face thereof, said opening having a cross-sectional area substantially proportional to the reduction in cross-sectional area of the die aperture under applied extrusion force, said opening being located within the flat front face of the die block exposed to applied extrusion force and adjacent the die aperture, and a cover overlying the opening in the flat front face of the die block preventing ingress of material under extrusion into the opening.

References Cited in the file of this patent

UNITED STATES PATENTS

| | | |
|---|---|---|
| 1,443,324 | McGovern | Jan. 23, 1923 |
| 2,770,836 | Hankey | Nov. 20, 1956 |
| 2,771,636 | McIntosh | Nov. 27, 1956 |
| 2,791,187 | Ambrette | May 7, 1957 |

FOREIGN PATENTS

| | | |
|---|---|---|
| 768,283 | Great Britain | Feb. 13, 1957 |